United States Patent
Swaminathan et al.

(10) Patent No.: US 9,319,313 B2
(45) Date of Patent: Apr. 19, 2016

(54) SYSTEM AND METHOD OF FORWARDING IPMI MESSAGE PACKETS BASED ON LOGICAL UNIT NUMBER (LUN)

(71) Applicant: AMERICAN MEGATRENDS, INC., Norcross, GA (US)

(72) Inventors: Viswanathan Swaminathan, Suwanee, GA (US); David Wise, Lawrenceville, GA (US); Balaji Nagalingam Rajendiran, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 187 days.

(21) Appl. No.: 14/160,911

(22) Filed: Jan. 22, 2014

(65) Prior Publication Data
US 2015/0207731 A1 Jul. 23, 2015

(51) Int. Cl.
*H04L 12/741* (2013.01)
*H04L 29/06* (2006.01)
*G06F 21/00* (2013.01)
*G06F 3/00* (2006.01)
*G06F 13/14* (2006.01)

(52) U.S. Cl.
CPC ............... *H04L 45/74* (2013.01); *H04L 69/22* (2013.01); *G06F 3/00* (2013.01); *G06F 13/14* (2013.01); *G06F 21/00* (2013.01)

(58) Field of Classification Search
CPC .............................. H04L 45/74; H04L 69/22
USPC ........................................................ 370/392
See application file for complete search history.

(56) References Cited

U.S. PATENT DOCUMENTS

| | | | | |
|---|---|---|---|---|
| 7,685,281 B1* | 3/2010 | Saraiya | ................ | G06F 13/387 370/392 |
| 2005/0267956 A1* | 12/2005 | Huang | ................ | H04L 41/069 709/223 |
| 2009/0013056 A1* | 1/2009 | Weinstock | ............ | G06F 3/1462 709/208 |
| 2009/0262741 A1* | 10/2009 | Jungck | .............. | H04L 29/12066 370/392 |
| 2010/0103837 A1* | 4/2010 | Jungck | .............. | H04L 29/12066 370/252 |
| 2012/0023210 A1* | 1/2012 | Lai | ............................ | G06F 9/46 709/223 |
| 2013/0117766 A1* | 5/2013 | Bax | ........................ | G06F 13/14 719/323 |
| 2014/0013388 A1* | 1/2014 | Chandrasekhar | ....... | G06F 21/70 726/3 |
| 2014/0244886 A1* | 8/2014 | Meert | ................... | G06F 13/409 710/306 |

OTHER PUBLICATIONS

Intel et al., "—IPMI—Intelligent Platform Management Interface Specification Second Generation", Feb. 2004, Intel Corporation, Hewlett-Packard Company, NEC Corporation, Dell Computer Corporation, v2.0, pp. 1-206.*

* cited by examiner

*Primary Examiner* — Un C Cho
*Assistant Examiner* — Shah Rahman
(74) *Attorney, Agent, or Firm* — Locke Lord LLP; Tim Tingkang Xia, Esq.

(57) ABSTRACT

Certain aspects direct to a system having at most four service processors (SP's). Each of the at most four SP's is assigned with a logical unit number (LUN) of 0 to 3. When the SP receives a message packet, the SP identifies the message packet based on the header of the message packet. The header uses a LUN field to identify a corresponding SP as a destination of the message packet. For the LUN 0 SP, when the message packet is identified as a request message packet for the LUN 0 SP, the SP processes the request message packet to generate a corresponding response message packet. When the message packet is identified as a request message packet for other SP's (LUN 1-3), the SP saves a copy of the header of the request message packet for later response use, and forwards the request message packet to the destination.

25 Claims, 9 Drawing Sheets

SYSTEM AND METHOD OF FORWARDING IPMI MESSAGE PACKETS BASED ON LOGICAL UNIT NUMBER (LUN)

FIELD

The present disclosure relates generally to Intelligent Platform Management Interface (IPMI) message transmission, and particularly to a system and method of forwarding IPMI message packets based on the logical unit number (LUN).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, a service processor (SP) or a baseboard management controller (BMC) refers to a specialized microcontroller that manages the interface between system management software and platform hardware. The SP can be embedded on the motherboard of a computer, generally a server. For example, different types of sensors can be built into the computer system, and the SP reads these sensors to obtain parameters such as temperature, cooling fan speeds, power status, operating system (OS) status, etc. The SP monitors the sensors and can send alerts to a system administrator via the network if any of the parameters do not stay within preset limits, indicating a potential failure of the system. The administrator can also remotely communicate with the SP to take some corrective action such as resetting or power cycling the system to get a hung OS running again.

In a standard rack server system, a SP can be used for managing and monitoring the server system. However, in a blade server system, a blade enclosure (generally referred to as a chassis) encloses multiple blade servers, with each blade server having many components removed to save space, minimize power consumption and other considerations, while still having all the functional components to be considered a computer. In this case, each blade server may use a SP for managing and monitoring the corresponding blade server, and data transmission between the blade servers or between the SP's of the blade servers may be required.

Therefore, an unaddressed need exists in the art to address the aforementioned deficiencies and inadequacies.

SUMMARY

Certain aspects of the disclosure direct to a system, which includes a network switch, and at most four service processors (SP's) interconnected with one another via the network switch. Each of the at most four SP's is assigned with a logical unit number (LUN) of 0, 1, 2 or 3, and includes a processor, a non-volatile memory and at least one system interface. For each SP, the non-volatile memory stores computer executable codes are configured to, when executed at the processor, receive a message packet from the at least one system interface, where the message packet includes a header identifying the message packet as a request message packet or a response message packet, and where the header includes a LUN field identifying one of the at most four SP's; identify, based on the header and the LUN field of the message packet, the message packet as a first request message packet having one other of the at most four SP's as a destination of the message packet, an intermediate response message packet from one other of the at most four SP's in response to the first request message packet, or a second request message packet having the SP as the destination of the message packet; when the message packet is the first request message packet, save a copy of the header of the first request message packet, and send the first request message packet to the destination; when the message packet is the intermediate response message packet in response to the first request message packet, retrieve the saved copy of the header of the first request message packet, and replace the header of the intermediate response message packet with the saved copy of the header of the first request message packet to generate a final response message packet; and when the message packet is the second request message packet, process the second request message packet to generate a second response message packet in response to the second request message packet.

In certain embodiments, the at least one system interface includes a local area network (LAN) interface, a standardized interface under an Intelligent Platform Management Interface (IPMI) standard, or a universal serial bus (USB) interface.

In certain embodiments, the standardized interface includes a a keyboard controller style (KCS) interface, a system management interface chip (SMIC) interface, and a block transfer (BT) interface.

In certain embodiments, each of the at most four SP's is a baseboard management controller (BMC).

In certain embodiments, the system further includes at most four blade servers, each corresponding to one of the at most four SP's.

In certain embodiments, the codes include: a packet receiving module configured to receive the message packet from the at least one system interface; a message handler module configured to, when the message packet is the second request message packet, process the second request message packet to generate the second response message packet in response to the second request message packet; and a platform development kit (PDK) module configured to generate a request queue and a response queue, identify, based on the header and the LUN field of the message packet, the message packet as the first request message packet, the intermediate response message packet, or the second request message packet, when the message packet is the first request message packet, send the message packet to the request queue, when the message packet is the intermediate response message packet, send the message packet to the response queue, and when the message packet is the second request message packet, send the message packet to the message handler module.

In certain embodiments, for the SP assigned with the LUN of 1, 2 or 3, the PDK module is configured to identify the message packet as the second request message packet.

In certain embodiments, for the SP assigned with the LUN of 0, the codes further include: an original equipment manufacturer (OEM) process packet thread module, configured to receive the first request message packet from the request queue, save the copy of the header of the first request message packet, replace the header of the first request message packet with a LAN header to generate a LAN request message packet, and send the LAN request message packet to the destination, receive the intermediate response message packet from the response queue, and retrieve the saved copy of the header of the first request message packet, and replace the header of the intermediate request message packet with the saved copy of the header of the first request message packet to generate the final response message packet.

In certain embodiments, the message packet is an IPMI OEM message packet.

In certain embodiments, the header of the message packet includes a network function (NetFn) field identifying the message packet as the request message packet or the response message packet.

Certain aspects of the disclosure direct to a method of forwarding messages in a blade server system, which includes: receiving, at a service processor (SP) of the blade server system, a message packet from a system interface of the SP, where the blade server system includes a network switch and at most four SP's interconnected with one another via the network switch, where each of the at most four SP's is assigned with a logical unit number (LUN) of 0, 1, 2 or 3, and where the message packet includes a header identifying the message packet as a request message packet or a response message packet, where the header includes a LUN field identifying one of the at most four SP's of the blade server system; based on the header and the LUN field of the message packet, identifying, at the SP, the message packet as a first request message packet having one other of the at most four SP's as a destination of the message packet, an intermediate request message packet from one other of the at most four SP's in response to the first request message packet, or a second request message packet having the SP as the destination of the message packet; when the message packet is the first request message packet, saving, at the SP, a copy of the header of the first request message packet, and sending the first request message packet to the destination; when the message packet is the intermediate response message packet in response to the first request message packet, retrieving, at the SP, the saved copy of the header of the first request message packet, and replacing the header of the intermediate response message packet with the saved copy of the header of the first request message packet to generate a final response message packet; and when the message packet is the second request message packet, processing, at the SP, the second request message packet to generate a second response message packet in response to the second request message packet.

In certain embodiments, the at least one system interface includes a LAN interface, a standardized interface under an IPMI standard, or a USB interface. In certain embodiments, the standardized interface includes a KCS interface, a SMIC interface, and a BT interface.

In certain embodiments, each of the at most four SP's is a BMC. In certain embodiments, the blade server system further includes at most four blade servers, and each of the at most four blade servers corresponds to one of the at most four SP's.

In certain embodiments, the method further includes: generating, at a PDK module of the SP, a request queue and a response queue, wherein the PDK module is configured to, based on the header and the LUN field of the message packet, identify the message packet as the first request message packet, the intermediate request message packet, or the second request message packet; when the message packet is the first request message packet, sending, at the PDK module of the SP, the message packet to the request queue, wherein an OEM process packet thread module is configured to receive the first request message packet from the request queue, save the copy of the header of the first request message packet, replace the header of the first request message packet with a LAN header to generate a LAN request message packet, and send the LAN request message packet to the destination; when the message packet is the intermediate response message packet, sending, at the PDK module of the SP, the message packet to the response queue, wherein the OEM process packet thread module is configured to receive the intermediate response message packet from the response queue, retrieve the saved copy of the header of the first request message packet, and replace the header of the intermediate request message packet with the saved copy of the header of the first request message packet to generate the final response message packet; and when the message packet is the second request message packet, sending, at the PDK module of the SP, the message packet to a message handler module of the SP, wherein the message handler module is configured to process the second request message packet to generate the second response message packet in response to the second request message packet.

In certain embodiments, for the SP assigned with the LUN of 1, 2 or 3, the PDK module is configured to identify the message packet as the second request message packet.

In certain embodiments, the message packet is an IPMI OEM message packet.

In certain embodiments, the header of the message packet includes a NetFn field identifying the message packet as the request message packet or the response message packet.

Certain aspects of the disclosure direct to a non-transitory computer readable medium storing computer executable codes. The the codes, when executed at a processor of a service processor (SP) of a blade server system, are configured to: receive a message packet from a system interface of the SP, where the blade server system includes a network switch and at most four SP's interconnected with one another via the network switch, where each of the at most four SP's is assigned with a LUN of 0, 1, 2 or 3, and where the message packet includes a header identifying the message packet as a request message packet or a response message packet, where the header includes a LUN field identifying one of the at most four SP's of the blade server system, identify, based on the header and the LUN field of the message packet, the message packet as a first request message packet having one other of the at most four SP's as a destination of the message packet, an intermediate request message packet from one other of the at most four SP's in response to the first request message packet, or a second request message packet having the SP as the destination of the message packet, when the message packet is the first request message packet, save a copy of the header of the first request message packet, and send the first request message packet to the destination, when the message packet is the intermediate response message packet in response to the first request message packet, retrieve the saved copy of the header of the first request message packet, and replace the header of the intermediate response message packet with the saved copy of the header of the first request message packet to generate a final response message packet, and when the message packet is the second request message packet, process the second request message packet to generate a second response message packet in response to the second request message packet.

In certain embodiments, the at least one system interface includes a LAN interface, a standardized interface under an IPMI standard, or a USB interface. In certain embodiments, the standardized interface includes a KCS interface, a SMIC interface, and a BT interface.

In certain embodiments, each of the at most four SP's is a BMC. In certain embodiments, the blade server system further includes at most four blade servers, and each of the at most four blade servers corresponds to one of the at most four SP's.

In certain embodiments, the codes include: a packet receiving module configured to receive the message packet from the at least one system interface; a message handler module configured to, when the message packet is the second request message packet, process the second request message packet to generate the second response message packet in response to the second request message packet; and a PDK module configured to generate the request queue and a response queue, identify, based on the header and the LUN field of the message packet, the message packet as the first request message packet, the intermediate response message packet, or the second request message packet, when the message packet is the first request message packet, send the message packet to the request queue, when the message packet is the intermediate response message packet, send the message packet to the response queue, and when the message packet is the second request message packet, send the message packet to the message handler module.

In certain embodiments, for the SP assigned with the LUN of 1, 2 or 3, the PDK module is configured to identify the message packet as the second request message packet.

In certain embodiments, for the SP assigned with the LUN of 0, the codes further include: an OEM process packet thread module, configured to receive the first request message packet from the request queue, save the copy of the header of the first request message packet, replace the header of the first request message packet with a LAN header to generate a LAN request message packet, and send the LAN request message packet to the destination, receive the intermediate response message packet from the response queue, and retrieve the saved copy of the header of the first request message packet, and replace the header of the intermediate request message packet with the saved copy of the header of the first request message packet to generate the final request message packet.

In certain embodiments, the message packet is an IPMI OEM message packet.

In certain embodiments, the header of the message packet includes a NetFn field identifying the message packet as the request message packet or the response message packet.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
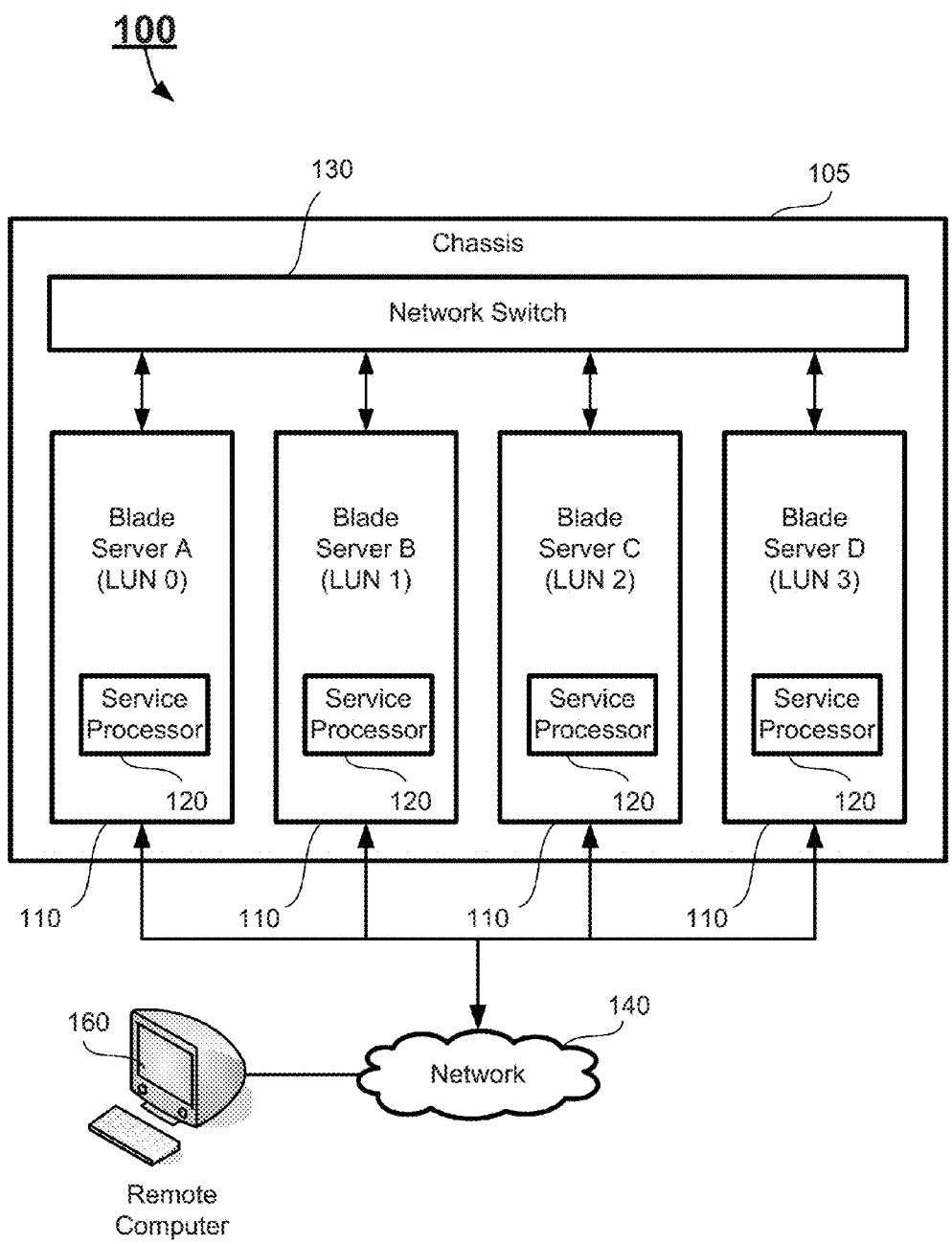
FIG. 1 schematically depicts a blade server system having four blade servers according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure generally relates to IPMI message transmission, and particularly to a system and method of forwarding IPMI message packets based on the LUN. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a SP through an operating system or through an external connection, such as through a network or serial connection. Additional details regarding IPMI can be found in the IPMI Specification (Version 2.0), which is publicly available from INTEL CORPORATION, and which is incorporated herein by reference.

As per IPMI Specification of version 1.5 and newer version, the Send Message command has to be used to perform extended bridging of IPMI messages to the SP or BMC. With the Send Message command definition, there is an overhead to wait for a period of time to receive a response from the bridged message. The application that sends the request also has to decipher whether the returned response is a response to the Send message command or a response to the encapsulated IPMI message.

Additionally, in a blade server system, there is added complexity need in the SP or BMC to synchronize the bridged requests and responses when using Send Message. For example, when the SP receives a Send Message command, the SP only forwards the IPMI message over the specified interface without parsing the encapsulated IPMI command. In this case, the SP then needs to maintain a pending bridge table in order to direct the incoming response to the proper requester. This adds unnecessary complexity as well as intrinsic delay because of processing.

To reduce the complexity and the delay incurred because of the Send Message command, the present disclosure utilizes the logical unit number (LUN) field in the IPMI request messages to direct the message to the proper destination of the request. Thus, external applications requesting data from the SP can simply specify the designated LUN number in the LUN field of the IPMI request message to send and receive responses from a specified SP with a designated LUN in the chassis.

FIG. 1 schematically depicts a blade server system having four blade servers according to certain embodiments of the present disclosure. As shown in FIG. 1, the blade server system 100 includes a chassis 105, which encloses four blade servers 110. Each of the four blade servers 110 has a service processor (SP) 120, and is connected to a network switch 130, which implements an internal network between the blade servers 110 of the blade server system 110. In certain embodiments, the blade server system 100 may include other physical or virtual components not shown in FIG. 1.

Further, at least one of the four blade servers 110 is connected to a network 140 outside the blade server system 100. The network 140 may be a wired or wireless network, and may be of various forms such as a local area network (LAN) or wide area network (WAN) including the Internet, or a standardized IPMI system interfaces, such as an Intelligent Platform Management Bus (IPMB) interface, a keyboard controller style (KCS) interface, a system management interface chip (SMIC) interface or a block transfer (BT) interface. In certain embodiments, one or more remote computers 160 may be connected to the network 140, such that a user may use a remote computer 160 to remotely connect to the blade server system 100 via the network 140 to perform certain client-server operations.

In certain embodiments, each of the four blade servers 110 and the corresponding SP's 120 may be respectively assigned with a LUN from 0 to 3 based on the slot location of the blade servers 110 in the chassis 105. For example, the first blade server 110 (labeled blade server A) at the far left of FIG. 1 is assigned with the LUN 0, the second blade server 110 (labeled blade server B) at the middle left of FIG. 1 is assigned with the LUN 1, the third blade server 110 (labeled blade server C) at the middle right of FIG. 1 is assigned with the LUN 2, and the fourth blade server 110 (labeled blade server D) at the far right of FIG. 1 is assigned with the LUN 3. The use of the LUN for the blade servers 110 will be described later.

In certain embodiments, the blade server system 100 may include less than four blade servers 110 and corresponding SP's 120. For example, the blade server system 100 may include three blade servers 110 and corresponding SP's 120. In this case, each of the three blade servers 110 and the corresponding SP's 120 may be respectively assigned with a LUN from 0 to 2 based on the slot location of the blade servers 110 in the chassis 105, and the LUN of 3 may be inactive.

The chassis 105 holds the blade servers 110 and other components of the blade server system 100, and provides non-core computing services for blade server system 100, such as power, cooling, networking, various interconnects and management. The specific services provided by the chassis 105 may vary by different vendors. In certain embodiments, the chassis 105 may provide multiple physical hardware interfaces for the blade servers 110, such as electrical connectors, buses, ports, cables, terminals, or other I/O devices.

Figure 2:
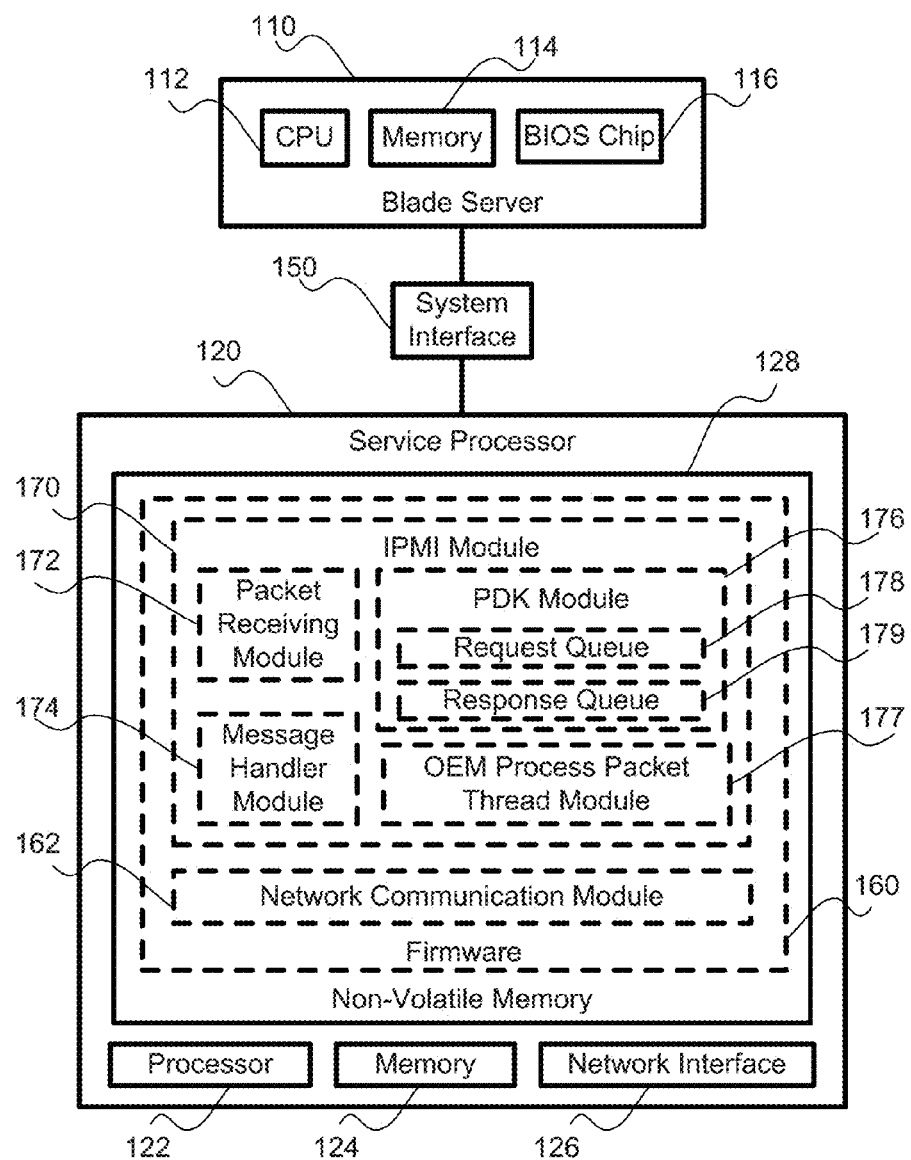
FIG. 2 schematically depicts a blade server and a service processor of the blade server system according to certain embodiments of the present disclosure.

FIG. 2 schematically depicts a blade server 110 and a service processor 120 of the blade server system according to certain embodiments of the present disclosure. As shown in FIG. 2, the SP 120 is connected to the host computer 110 via a system interface 150. In certain embodiments, the system interface 150 may be a typical standardized IPMI system interfaces, such as the IPMB interface, the SMIC interface or the BT interface. In certain embodiments, the IPMB interface, the SMIC interface and/or the BT interface. In certain embodiments, the system interface 150 may be a universal serial bus (USB) interface. In certain embodiments, the SP 120 may be connected to the host computer 110 via more than one system interface 150. For example, the SP 120 may be connected to the host computer 110 via a KCS interface and a USB interface. In certain embodiments, data transmission between the host computer 110 and the SP 120 can be in the format of IPMI original equipment manufacturer (OEM) messages, which go through the system interface 150.

Each of the blade servers 110 is a stripped down server computer with a modular design optimized to minimize the use of physical space and energy. In certain embodiments, the blade server 110 may include a baseboard or the "motherboard" (not shown), and the components on the baseboard of the host computer 110 include, but not limited to, a central processing unit (CPU) 112, a memory 114, a BIOS chip 116 and other required memory and I/O modules (not shown). In certain embodiments, the SP 120 may also be a component on the baseboard of the blade server 110. In certain embodiments, the CPU 112, the memory 114, and the BIOS chip 116 may be embedded on the baseboard, or may be connected to the baseboard through at least one interface. In certain embodiments, the interface may be physical hardware interface such as electrical connectors, buses, ports, cables, terminals, or other I/O devices. In certain embodiments, the blade server 110 may include at least one I/O device (not shown) for generating and controlling input and output signals of the blade server 110 to the network 140 outside the blade server system 100. Examples of the I/O device include keyboards, touch pads, mouse, microphones, display screens, touch screens, or other I/O devices applicable for the host computer 110. Some I/O devices, such as touch screens, are provided for the dual input/output purposes.

The CPU 112 is a processor which is configured to control operation of the blade server 110, and to execute the software applications for the blade server 110. In certain embodiments, the blade server 110 may run on or more than one CPU as the host processor, such as two CPUs, four CPUs, eight CPUs, or any suitable number of CPUs.

The memory 114 can be a volatile memory, such as the random-access memory (RAM), for storing the data and information during the operation of the blade server 110. In certain embodiments, the memory 114 is in communication with the CPU 112 through a system bus (not shown).

The BIOS chip 116 can be a non-volatile memory, such as a flash memory chip, an electrically erasable programmable read-only memory (EEPROM) chip or a complementary metal oxide semiconductor (CMOS) memory, for storing a BIOS image (not shown). The BIOS image is an image file storing the firmware codes which, when executed at the CPU 112, are configured to perform the startup functions, or the booting functions, for the blade server 110.

It should be appreciated that the blade server 110 may not necessarily have a storage device. In certain embodiments, at least one storage device may be provided in the chassis 105 of the blade server system 100 to store the software applications, such as an operating system (OS) 160 and other necessary software applications, for the four blade servers 110.

The SP 120 is a specialized microcontroller that manages the interface between system management software and platform hardware. In certain embodiments, the SP 120 may be a baseboard management controller (BMC). Different types of sensors can be built into the blade server 110, and the SP 120 reads these sensors to obtain parameters such as temperature, cooling fan speeds, power status, OS status, etc.

The SP 120 monitors the sensors and can send out-of-band (OOB) alerts to a system administrator of the blade server 110 if any of the parameters do not stay within preset limits, indicating a potential failure of the blade server 110. In certain embodiments, the administrator can also remotely communicate with the SP 120 from a remote management computer via the network 140 to take remote action to the host computer. For example, the administrator may reset the blade server 110 from the remote management computer through the SP 120, and may obtain system information of the blade server 110 OOB without interrupting the operation of the blade server 110.

As shown in FIG. 2, the SP 120 includes a processor 122, a memory 124, a network interface 126, and a non-volatile memory 128. In certain embodiments, the SP 120 may include other components, such as at least one I/O device (not shown).

The processor 122 controls operation of the SP 120. The processor 122 can execute the firmware or other codes stored in the non-volatile memory 128 of the SP 120. In certain embodiments, the SP 120 may run on or more than one processor.

The memory 124 can be a volatile memory, such as the RAM, for storing the data and information during the operation of the SP 120. When the SP 120 restarts, the contents stored in the memory 124 will be lost.

The network interface 126 is configured to perform communication for the SP 120 with the network switch 130 (i.e. the internal network) of the blade server system 100 and/or the network 140 outside the blade server system 100. In certain embodiments, the network interface 126 is a LAN interface when the internal network and the network 140 are LANs. In certain embodiments, the network interface 126 may be other system interfaces of the SP 120, such as the IPMB interface, the KCS interface, the SMIC interface, the BT interface, or the USB interface, or any other communication interfaces.

In certain embodiments, the network interface 126 may include multiple interfaces. For example, the SP 120 may include two LAN interfaces. In certain embodiments, one of the LAN interfaces is a MAC1 LAN interface configured to connect the SP 110 to the network 140 outside the blade server system 110, and the other of the two LAN interfaces is a MAC2 LAN interface configured to connect the SP 110 to the network switch 130. The MAC1 and MAC2 LAN interfaces are both LAN interface implemented based on the standard of the data link layer 2 of the open system interconnect (OSI) model, which is defined under IEEE 802.2.

The non-volatile memory 128 stores the firmware 160 of the SP 120. The firmware 160 of the SP 120 includes computer executable codes for performing the operation of the SP 120. As shown in FIG. 2, the firmware 160 of the SP 120 includes, among other things, a network communication module 162 and an IPMI module 170. In certain embodiments, the firmware 160 may include other necessary modules to perform operations of the SP 120.

The network communication module 162 controls network connection of the SP 120 through the network interface 126 and other system interface for performing communication with the network switch 130 (i.e. the internal network) of the blade server system 100 and/or the network 140 outside the blade server system 100. In certain embodiments, the network communication module 162 includes network configuration data for the SP 120 and the blade server 110. In certain embodiments, when the network interface 126 includes a MAC2 LAN interface configured for connecting the SP 110 to the network switch 130, the network communication module 162 may assign a static internet protocol (IP) address to the MAC2 LAN interface. In certain embodiments, the static IP address may be set based on the LUN of the blade server 110. For example, for the first blade server A 110 having the LUN of 0, the static IP address may be assigned as 10.10.10.0. For the second blade server B 110 having LUN of 1, the static IP address may be assigned as 10.10.10.1. For the second blade server C 110 having LUN of 2, the static IP address may be assigned as 10.10.10.2. For the second blade server D 110 having LUN of 3, the static IP address may be assigned as 10.10.10.3.

The IPMI module 170 is a program for generating and processing IPMI messages for the SP 120. In certain embodiments, when the firmware 160 generates data to be sent out from the SP 120 to a destination (e.g. the blade server 110, other SP's 120, or outside network 140) under the IPMI architecture, the firmware 160 sends the data to the IPMI module 170. Upon receiving the data, the IPMI module 170 processes the data to generate corresponding IPMI OEM messages such that the SP 120 may send the IPMI OEM messages to the destination (e.g. the blade server 110, other SP's 120, or outside network 140). When the SP 120 receives IPMI OEM messages from other IPMI compatible devices (e.g. the blade server 110, other SP's 120, or outside network 140), the firmware 160 of the SP 120 sends the received IPMI OEM messages to the IPMI module 170. The IPMI module 170 may then process the IPMI OEM messages to generate data recognizable by the firmware 160, and send the data to the firmware 160 for further process.

Currently, almost all firmware of SP's or BMC's available in the market supports the IPMI architecture, and provide a variety of IPMI modules 170. In certain embodiments, the IPMI module 170 can be a part of the firmware 160 of the SP 120, which is compatible to the IPMI architecture for generating IPMI messages. In certain embodiments, the IPMI module 170 is separated from the firmware 160 of the SP 120 as an independent program.

In certain embodiments, in addition to the standard predefined commands and parameters, IPMI allows OEM extensions for the manufacturers and users to define OEM specific commands. A user may use IPMI OEM messages to control data transmission via the system interface 150. The IPMI OEM messages may be used for the data transaction between the blade servers 110 and the SP's 120.

As shown in FIG. 2, the IPMI module 170 includes a packet receiving module 172, a message handler module 174, a platform development kit (PDK) module 176, and an OEM process packet thread module 177.

The packet receiving module 172 is configured to receive message packets. Upon receiving the message packets, the packet receiving module 172 sends the message packets to the PDK module 176 for further processing. In certain embodiments, the message packets may be OEM message packets, and may be in the format of any standard recognizable by the SP 120. For example, the OEM message packets may be IPMI OEM message packets, or OEM message packets transmittable via the MAC2 LAN interface.

In certain embodiments, the packet receiving module 172 receives the message packets from the network 140 outside the blade server system 100. In certain embodiments, when the network interface 126 of the SP 120 includes a MAC1 LAN interface configured to connect the SP 110 to the network 140 outside the blade server system 110, the packet receiving module 172 receives the message packets via the MAC1 LAN interface. In certain embodiments, the message packets can be IPMI OEM message packets.

In certain embodiments, the packet receiving module 172 receives the message packets from the network switch 130, which implements the internal network of the blade server system 100. In certain embodiments, when the network interface 126 of the SP 120 includes a MAC2 LAN interface configured for connecting the SP 110 to the network switch 130, the packet receiving module 172 receives the message packets via the MAC2 LAN interface. In certain embodiments, the message packets can be OEM message packets transmittable via the MAC2 LAN interface.

As discussed above, at least one of the four blade servers 110 is connected to the network 140 outside the blade server system 100. In certain embodiments, exactly one of the four blade servers 110 is directly connected to the network 140. In other words, only one blade server 110 receives message packets directly from the network 140 outside the blade server system 110. Meanwhile, all four blade servers 110, including the one blade server 110 capable of receiving outside message packets and the other three blade servers 110, may receive message packets from the internal network. For example, the first blade server A 110 having the LUN of 0 can be the blade server 110 connected to the network 140. Thus, the packet receiving module 172 of the SP 120 for the first blade server A 110 having the LUN of 0 may receive the message packets via the MAC1 LAN interface from the network 140. Further, the packet receiving module 172 of the SP 120 for each of the four blade servers A, B, C and D 110 may receive the message packets from the network switch 130. Details of the transmission of the message packets will be explained in detail later.

The message handler module 174 is a data processing module to process the data included in the message packets for the SP 120. When the PDK module 176 of the SP 120 processes with a request message packet and identifies, based on the LUN field of the header of the request message packet, that the corresponding blade server of the SP is the destination of the request message packet, the PDK module 176 sends the message packet to the message handler module 174 for processing the data in the request message packet. The message handler module 174 will process the data in the request message packet, generate a response message packet, and send the response message packet back to the network interface 126 where the request message packet was received to respond to the request message packet.

The PDK module 176 is an OEM source code porting structure processing module that can be used to add OEM specific functionality to the IPMI module 170. The PDK module 176 includes multiple porting hooks that can be called at various points from within the IPMI module 170 to perform certain IPMI OEM process.

In certain embodiments, the PDK module 176 performs operation to the OEM message packets for the IPMI module 170 to determine the destination of the message packets. During the operation of the PDK module 176, the PDK module 176 generates a request queue 178 and a response queue 179. The request queue 178 is a request queue for forwarding or outputting the message packet to other blade servers 110, and the response queue 179 is a response queue for receiving the response to the message packet from other blade servers 110.

As discussed above, when the network interface 126 of the SP 120 includes a MAC1 LAN interface configured to connect the SP 110 to the network 140 outside the blade server system 110, the packet receiving module 172 receives the message packets via the MAC1 LAN interface, and the message packets can be IPMI OEM message packets.

Generally, an IPMI message can be a request message (generally labeled as "rq") or a response message (generally labeled as "rs"). An IPMI message packet includes a header, an IPMI command, and a footer. The header of the IPMI message packet has a plurality of fields, including a network function (NetFn) field and a LUN field.

The NetFn field is a six-bit field that describes the network function of the IPMI message. The IPMI Specification defines certain predefined categories for the NetFn field, and there are reserved codes for OEM expansion. For a request message, the NetFn field is an odd number, and for a response message, the NetFn field is an even number. In other words, the NetFn field may be used to identify the IPMI message as a request message or a response message.

The LUN field is a two-digit logical unit number for sub-addressing purposes. In other words, the value of the LUN field can be 0 (00 in binary format), 1 (01 in binary format), 2 (10 in binary format), or 3 (11 in binary format). In certain embodiments, the header of the IPMI message packet also records information of the source where the IPMI message packet came from (i.e. the device generating the IPMI message packet and the interface through which the IPMI message packet was sent).

As discussed above, in the blade server system 100, each of the four blade servers 110 may be assigned with one LUN from 0 to 3. Thus, the LUN field of the IPMI message packet can be used to identify one of the four blade servers 110 as the destination of the message packet.

Figure 3A:
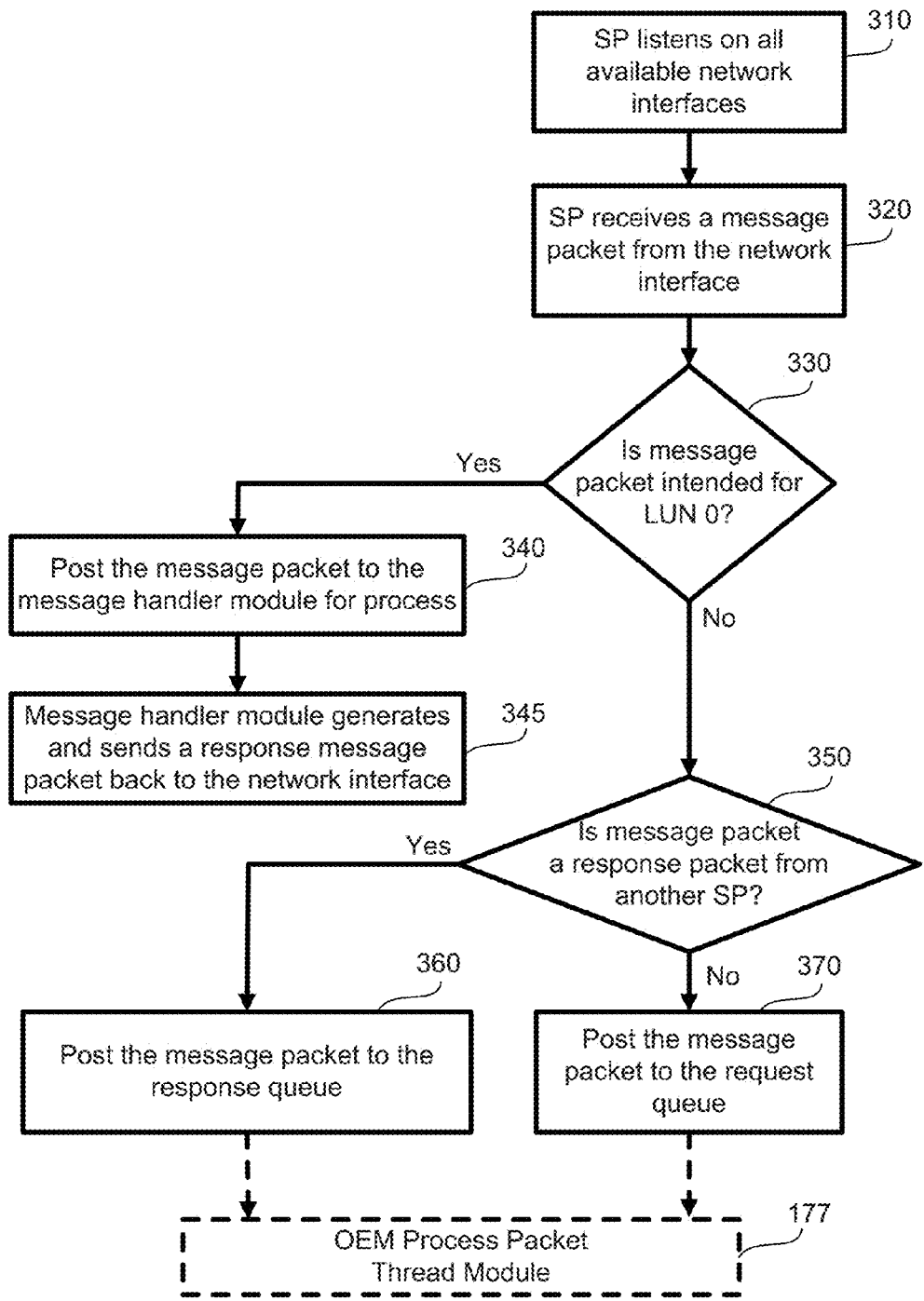
FIG. 3A depicts a flowchart showing operation of a PDK module of a SP for a blade server having LUN of 0 according to certain embodiments of the present disclosure.

FIG. 3A schematically depicts a flowchart showing operation of a PDK module of a SP for a blade server having LUN of 0 according to certain embodiments of the present disclosure. The PDK module 176 can be in the SP 120 of the first blade server A 110 having the LUN of 0, and the network interface 126 of the SP 120 includes a MAC1 LAN interface configured for connecting the SP 110 to the network 140 outside the blade server system 110 and a MAC2 LAN interface configured for connecting the SP 110 to the network switch 130 of the blade server system 100. Thus, the packet receiving module 172 may receive IPMI OEM request message packets via the MAC1 LAN interface from the network 140, or receive IPMI OEM response message packets via the MAC2 LAN interface from the network switch 130 (i.e. from other blade servers 110).

At procedure 310, the SP 120 listens on all available network interfaces 126 for the message packets. At procedure 320, when a message packet is sent to the SP 120, the packet receiving module 172 of the SP 120 receives the message packet from the network interface 126 (i.e. the MAC1 LAN interface), and sends the message packet to the PDK module 176. At procedure 330, the PDK module 176 parses the header of the message packet, and determines if the LUN field of the header includes a value of 0. If the value of the LUN field is 0, it indicates that the message packet is a request message packet for the SP 120 of the first blade server A 110 having the LUN of 0. Thus, the PDK module 176 enters procedure 340 to post the message packet to the message handler module 174 for processing the request message packet. After processing the request message packet, at procedure 345, the message handler module 174 generates a corresponding response message packet, and sends the response message packet back to the network interface 126 where the request message packet was received (i.e. the MAC1 LAN interface) to respond to the request message packet. In this case, the response message packet will be sent back to the network 140.

On the other hand, if the value of the LUN field is not 0, the message packet is not for the SP 120 of the first blade server A 110 having the LUN of 0, and the PDK module 176 needs to forward the message packet out. However, the message packet may be a request message packet for the SP 120 of the other three blade servers 110, or may be a response message packet from the SP 120 of the other three blade servers 110. Accordingly, at procedure 350, the PDK module 176 determines if the message packet is a response message packet from another SP 120. In certain embodiments, the PDK module 176 may check the value of the NetFn field of the header of the message packet to determine if the message packet is a response message packet.

If the message packet is a response message packet, the PDK module 176 enters procedure 360 to post the response message packet to the response queue 179, waiting for the OEM process packet thread module 177 to process the response message packet. If the message packet is not a response message packet, it is a request message packet, and the PDK module 176 enters procedure 370 to post the request message packet to the request queue 178, waiting for the OEM process packet thread module 177 to process the request message packet.

By posting the message packet to the message handler module 174 (procedure 340), the request queue 178 (procedure 370) or the response queue 179 (procedure 360), the PDK module 176 is freed up for processing the next message packet, and will not block the next incoming requests.

Figure 3B:
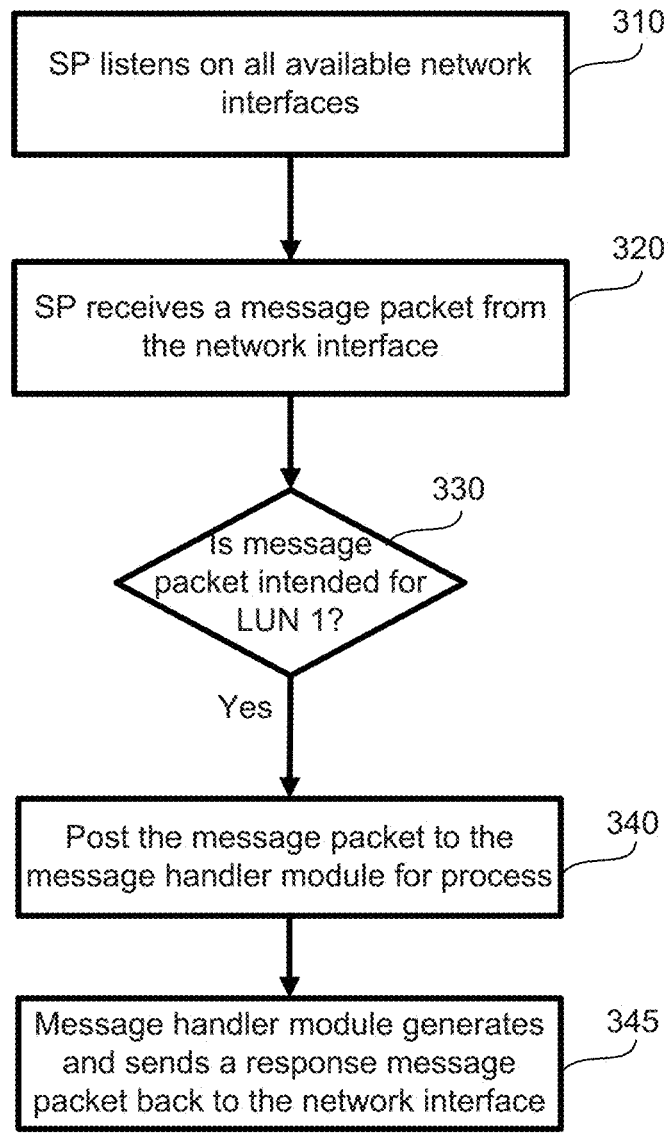
FIG. 3B depicts a flowchart showing operation of a PDK module of a SP for a blade server having LUN of 1 according to certain embodiments of the present disclosure.

FIG. 3B schematically depicts a flowchart showing operation of a PDK module of a SP for a blade server having LUN of 1 according to certain embodiments of the present disclosure. The PDK module 176 is in the SP 120 of the second blade server B 110 having the LUN of 1, and the network interface 126 of the SP 120 includes a MAC2 LAN interface configured for connecting the SP 110 to the network switch 130 of the blade server system 100. Thus, the packet receiving module 172 may receive a MAC2 LAN request message packets via the MAC2 LAN interface from the network switch 140 (i.e. from the first blade server A 110). It should be noted that the procedures as shown in FIG. 3B are similar to the procedures 310-345 as shown in FIG. 3A.

At procedure 310, the SP 120 listens on all available network interfaces 126 for the message packets. At procedure 320, when a message packet is sent to the SP 120, the packet receiving module 172 of the SP 120 receives the message packet from the network interface 126 (i.e. the MAC2 LAN interface), and sends the message packet to the PDK module 176.

At procedure 330, the PDK module 176 parses the header of the message packet, and determines if the LUN field of the header includes the value of 1. Since the message packet is the MAC2 LAN request message packet forwarded to the second blade server B 110 from the first blade server A 110, the LUN field of the header will always include the value of 1, indicating that the message packet is a MAC2 LAN request message packet for the SP 120 of the second blade server B 110 having the LUN of 1. Thus, the PDK module 176 enters procedure 340 to post the message packet to the message handler module 174 for processing the MAC2 LAN request message packet. After processing the request message packet, at procedure 345, the message handler module 174 generates a corresponding response message packet, and sends the response message packet back to the network interface 126 where the request message packet was received (i.e. the MAC2 LAN interface) to respond to the request message packet. In this case, the response message packet will be sent back to the first blade server A 110.

By posting the message packet to the message handler module 174 (procedure 340), the PDK module 176 is freed up for processing the next message packet, and will not block the next incoming requests.

In this embodiment, the PDK module 176 is in the SP 120 of the second blade server B 110 having the LUN of 1. For the third blade server C having the LUN of 2 and the fourth blade server D having the LUN of 3, the message packet will go through the similar process as shown in FIG. 3B.

The OEM process packet thread module 177 is a thread for processing message packets to be forwarded out. As discussed above, a message packet to be forwarded out may be a request message packet for the SP 120 of the other three blade servers 110, or may be a response message packet from the SP 120 of the other three blade servers 110. When the message packet is a request message packet for another SP 120, the PDK module 176 posts the request message packet to the request queue 178. When the message packet is a response message packet from another SP 120, the PDK module 176 posts the response message packet to the response queue 179. The OEM process packet thread module 177 listens to the request queue 178 and the response queue 179, and whenever a message packet is available in the request queue 178 or in the response queue 179, the OEM process packet thread module 177 processes the message packet and forwards the processed message packet out.

It should be appreciated that, in certain embodiments, only the first blade server A 110 is directly connected to the network. Thus, the other three blade servers B, C and D 110 are not directly connected to the network 140, and the OEM process packet thread module 177 in these blade servers 110 will never forward message packets to other blade servers 110. In other words, the OEM process packet thread module 177 in the second, third and fourth blade servers B, C and D 110 may be inactive.

Figure 4:
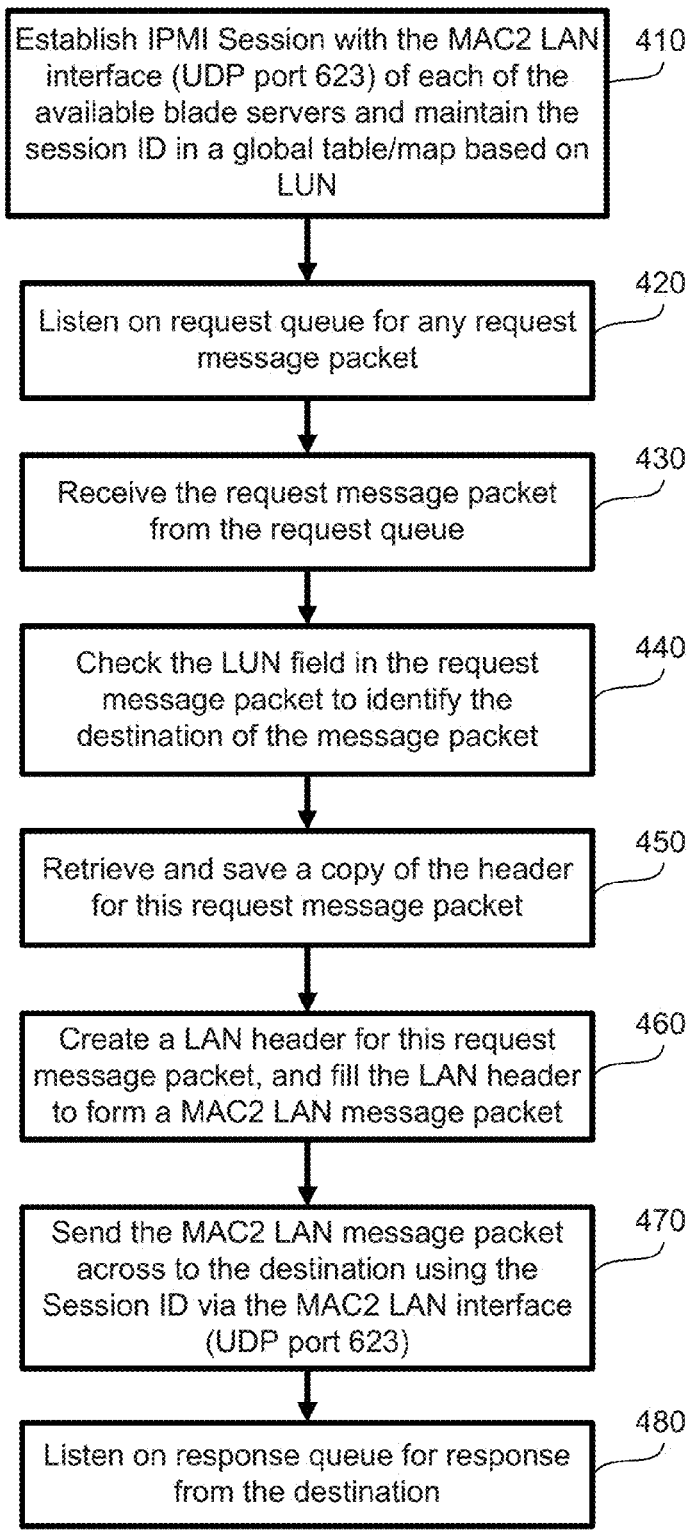
FIG. 4 depicts a flowchart showing operation of an OEM process packet thread module of a SP processing with the message packets in the request queue according to certain embodiments of the present disclosure.

FIG. 4 schematically depicts a flowchart showing operation of an OEM process packet thread module of a SP processing with the message packets in the request queue according to certain embodiments of the present disclosure. The OEM process packet thread module 177 as described in FIG. 4 is in the SP 120 of the first blade server A 110 having the LUN of 0, and the network interface 126 of the SP 120 includes a MAC1 LAN interface configured for connecting the SP 110 to the network 140 outside the blade server system 110 and a MAC2 LAN interface configured for connecting the SP 110 to the network switch 130 of the blade server system 100. Thus, the OEM process packet thread module 177 may forward the processed request message packets to other blade servers 110 through the network switch 130 (i.e. the internal network) of the blade server system 100 via the MAC2 LAN interface.

As shown in FIG. 4, in order to process the request message packets stored in the request queue 178 and forward each of the request message packets to the corresponding destination indicated by the LUN field, at procedure 410, the OEM process packet thread module 177 establishes IPMI sessions with the MAC2 LAN interface (UDP port 623) of each of the other available blade servers 110 through the network switch 130, and maintains the session ID in an array, a global table or map based on the LUN of each of the other available blade servers 110 for future communication. As discussed above, for each SP 120, the network communication module 162 may assign a static IP address to the MAC2 LAN interface, which is set based on the LUN of the blade server 110, and the OEM process packet thread module 177 knows the static IP address for the MAC2 LAN interface of the other three blade servers B, C and D 110. For example, the OEM process packet thread module 177 establishes IPMI sessions with the MAC2 LAN interface of the other three blade servers B, C and D 110, and maintains the session ID based on the LUN (i.e. 1, 2 and 3) for each of the three blade servers B, C and D 110.

After the IPMI sessions have been established, at procedure 420, the OEM process packet thread module 177 listens on the request queue 178 for any request message packet. Whenever the PDK module 176 posts a request message packet to the request queue 178, the request message packet becomes available to the OEM process packet thread module 177.

At procedure 430, the OEM process packet thread module 177 receives the request message packet from the request queue 178. At procedure 440, the OEM process packet thread module 177 checks the LUN field of the request message packet to identify the destination (i.e. one of the other three blade servers B, C and D 110) of the request message packet. For example, when the value of the LUN field of the request message packet is 1, the destination of the request message packet is the second blade server B 110. When the value of the LUN field of the request message packet is 2, the destination of the request message packet is the third blade server C 110. When the value of the LUN field of the request message packet is 3, the destination of the request message packet is the fourth blade server D 110.

At procedure 450, the OEM process packet thread module 177 retrieves and saves a copy of the header of the request message packet. As discussed above, the header of an IPMI message packet may store information of the source of the IPMI message packet (i.e. the device generating the IPMI message packet and the network interface 126 through which the IPMI message packet came from). Thus, by saving a copy of the header of the request message packet, the header can be used to refill into a response message packet corresponding to the request message packet, and the response message packet can be sent to the same network interface 126 where the request message packet came from (as described at procedure 320).

At procedure 460, the OEM process packet thread module 177 creates a LAN header for this request message packet, and fills the LAN header with the data of the request message packet to form a MAC2 LAN request message packet. In other words, in the newly formed MAC2 LAN request message packet, the LAN header replaces the header of the request message packet, and the data of the request message packet remains unchanged. In certain embodiments, the LAN header contains all the details to send the MAC2 LAN request message packet to the destination (which has been identified at procedure 440) via the MAC2 LAN interface, such as the LUN field, the static IP address of the destination, and the port number.

Once the MAC2 LAN request message packet is formed, at procedure 470, the OEM process packet thread module 177 forwards or sends the MAC2 LAN request message packet across to the destination using the session ID via the MAC2 LAN interface (UDP port 623). The session ID can be fetched from the array, the global table or the map as described at procedure 410.

After the request message packet has been forwarded, at procedure 480, the OEM process packet thread module 177 waits and listens on the response queue for the response from the destination.

Figure 5:
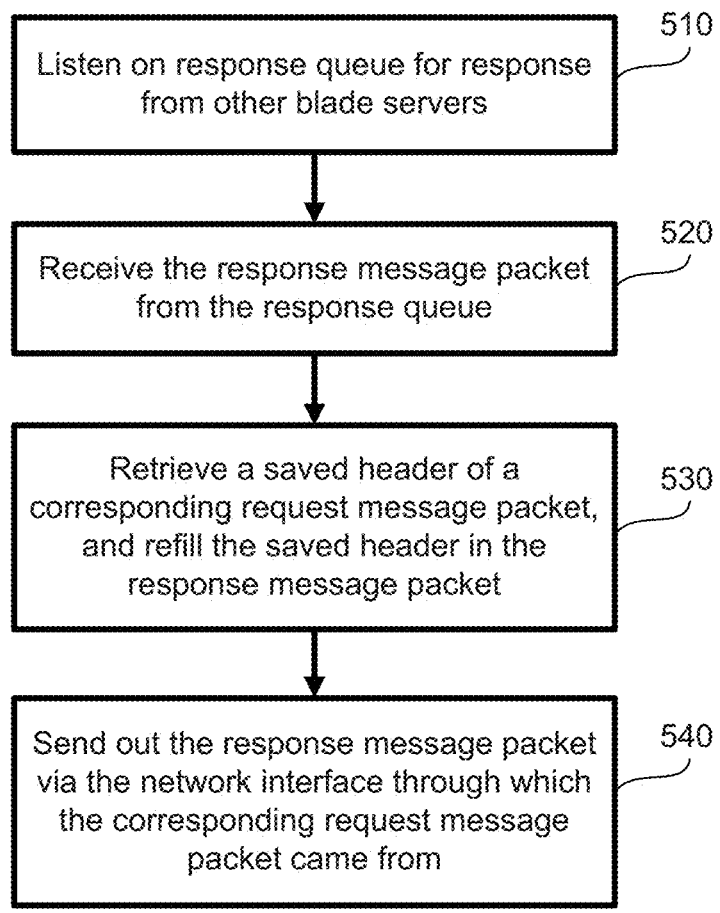
FIG. 5 depicts a flowchart showing operation of an OEM process packet thread module of a SP processing with the message packets in the response queue according to certain embodiments of the present disclosure.

FIG. 5 schematically depicts a flowchart showing operation of an OEM process packet thread module of a SP processing with the message packets in the response queue according to certain embodiments of the present disclosure. The OEM process packet thread module 177 as described in FIG. 5 is in the SP 120 of the first blade server A 110 having the LUN of 0, and the network interface 126 of the SP 120 includes a MAC1 LAN interface configured for connecting the SP 110 to the network 140 outside the blade server system 110 and a MAC2 LAN interface configured for connecting the SP 110 to the network switch 130 of the blade server system 100. Thus, the OEM process packet thread module 177 may receive the response message packets to other blade servers 110 through the network switch 130 (i.e. the internal network) of the blade server system 100 via the MAC2 LAN interface.

At procedure 510, the OEM process packet thread module 177 waits and listens on the response queue 179 for the response from the other blade servers 110 (i.e. the destination of the request message packet). Whenever the PDK module 176 posts a response message packet to the response queue 179, the response message packet becomes available to the OEM process packet thread module 177.

At procedure 520, the OEM process packet thread module 177 receives the response message packet from the response queue 179. Since the response message packet came from the other blade servers 110 (i.e. the destination of the request message packet), the header of the response message packet identifies the source of the response message packet as destination of the request message packet. Thus, the header of the response message packet must be replaced to identify the original source of the request message packet (i.e. the device generating the request message packet and the network interface 126 through which the IPMI message packet came from), such that the response message packet can be sent back to the original source of the request message packet.

At procedure 530, the OEM process packet thread module 177 checks the response message packet and retrieves a saved header of a corresponding request message packet to the response message packet (which was saved at procedure 450), and refills the saved header to the response message packet. Thus, the response message packet will have the information of the saved header to the corresponding request message packet, which identifies the source of the request message packet.

At procedure 540, the OEM process packet thread module 177 sends out the response message packet via the network interface 126 (i.e. the MAC1 LAN interface) through which the corresponding request message packet came from.

Once the OEM process packet thread module 177 sends out the response message packet, the OEM process packet thread module 177 will go back to procedure 420 to listen on the request queue 178 for any request message packet.

The remote management computer 160 can be a local mobile device serving as the client device of the blade server system 100, which is subject to receive actions from the user. As shown in FIG. 1, the remote computer 140 is remotely connected to the blade server system 100 via the network 140. One of ordinary skill in the art would appreciate that a plurality of remote management computer 160 may be provided for the blade server system 100. Examples of the remote computer 160 may include, for example, portable devices such as smartphones, tablets or other mobile computer devices. Although not explicitly shown in FIG. 1, the remote computer 160 may have a baseboard with a CPU and a memory embedded thereon, a storage device and at least one I/O device, such that the remote computer 160 is operable independently without being connected to the blade server system 100.

In certain embodiments, the remote computer 160 may generate an IPMI request message packet for a particular blade server 110 of the blade server system 100 at the remote computer 160, and send the IPMI request message packet from the remote computer 160 to the blade server system 100 via the network 140. The IPMI request message packet may be generated by a user manually, or by a remote application executed at the remote computer 160. In certain embodiments, the first blade server A 110 of the blade server system 100 will receive the IPMI request message packet, and forward the IPMI request message packet to the destination for processing the message packet, as described in FIGS. 3A and 4. Once the first blade server A 110 of the blade server system 100 receives and processes with the response message packet, the first blade server A 110 of the blade server system 100 will send the response message packet back to the remote computer 160 via the network 140.

Figure 6:
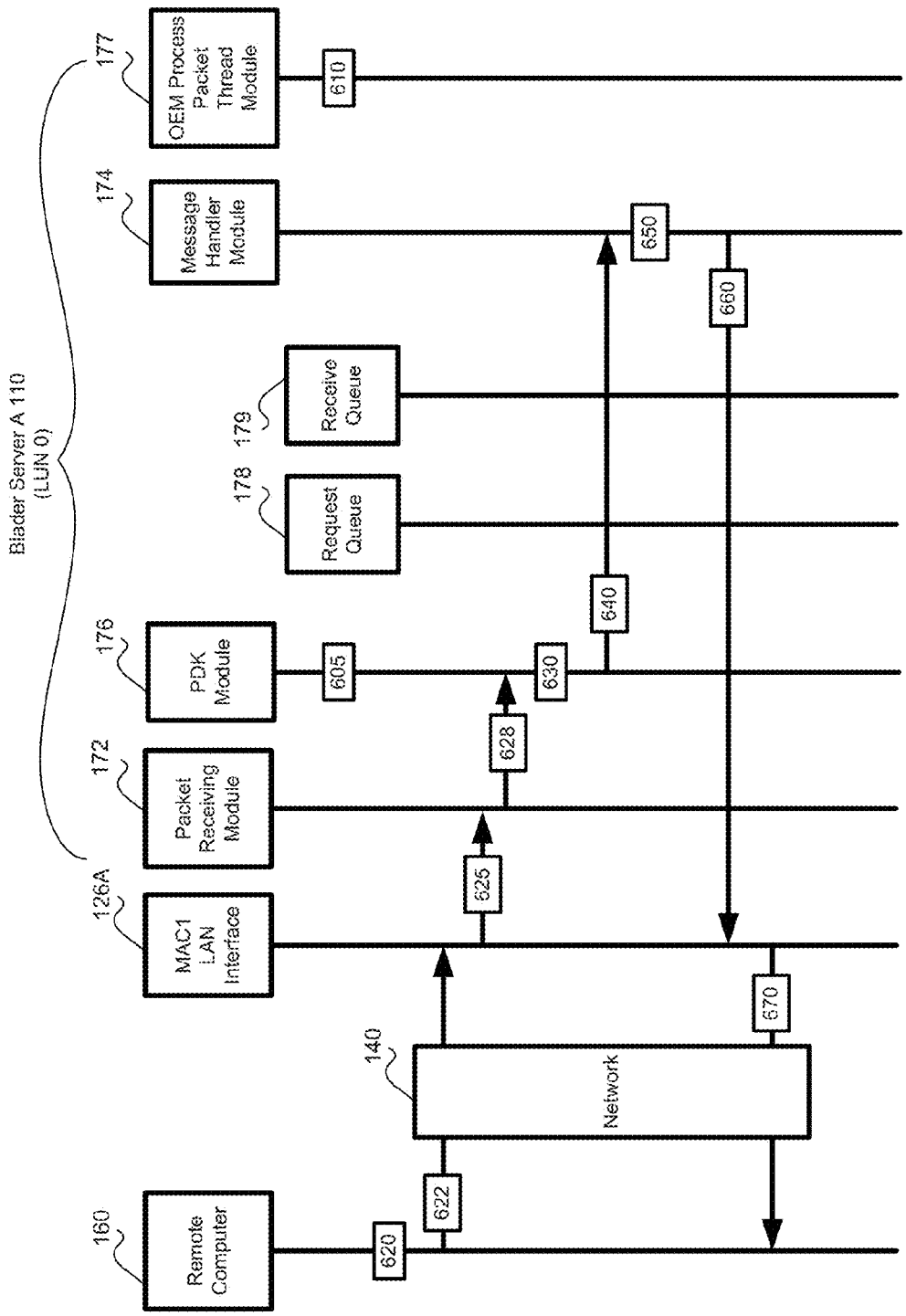
FIG. 6 schematically depicts the system process for an IPMI message generated by the remote computer to the blade server having the LUN 0 according to certain embodiments of the present disclosure.

FIG. 6 schematically depicts the system process for an IPMI message generated by the remote computer to the blade server having the LUN 0 according to certain embodiments of the present disclosure.

As shown in FIG. 6, at procedure 605, the PDK module 176 generates a request queue 178 and a response queue 179. At procedure 610, the OEM process packet thread module 177 establishes IPMI sessions with the MAC2 LAN interface (UDP port 623) of each of the other available blade servers 110 through the network switch 130, and maintains the session ID in an array, a global table or map based on the LUN of each of the other available blade servers 110 for future communication. It should be appreciated that the operations of the PDK module 176 and the OEM process packet thread module 177 may be independent from each other, and there is no specific sequence as to whether the PDK module 176 generates a request queue 178 and a response queue 179 before or after the OEM process packet thread module 177 establishes IPMI sessions.

At procedure 620, the remote computer 160 generates an IPMI request message packet, where the LUN field of the IPMI request message has the value of 0, identifying that the destination of the IPMI request message is the first blade server A 110. At procedure 622, the remote computer 160 sends the IPMI request message packet to the blade server system 100 via the network 140. Since the first blade server A 110 is the only blade server 110 directly connected to the network 140, the IPMI request message packet is sent to the MAC1 LAN interface 126A of the first blade server A 110.

At the first blade server A 110, at procedure 625, the packet receiving module 172 receives the IPMI request message packet from the MAC1 LAN interface 126A. At procedure 628, the packet receiving module 172 sends the IPMI request message packet to the PDK module 176 for process. At procedure 630, the PDK module 176 parses the header of the IPMI request message packet, and determines that the LUN field of the header includes the value of 0. At procedure 640, the PDK module 176 posts the IPMI request message packet to the message handler module 174. At procedure 650, the message handler module 174 processes with the IPMI request message packet, and generates a corresponding response message packet. After processing the request message packet, at procedure 660, the message handler module 174 sends the response message packet back to the MAC1 LAN interface 126A where the request message packet was received. At procedure 670, the response message packet is sent back to remote computer 160 via the network 140.

Figure 7A:
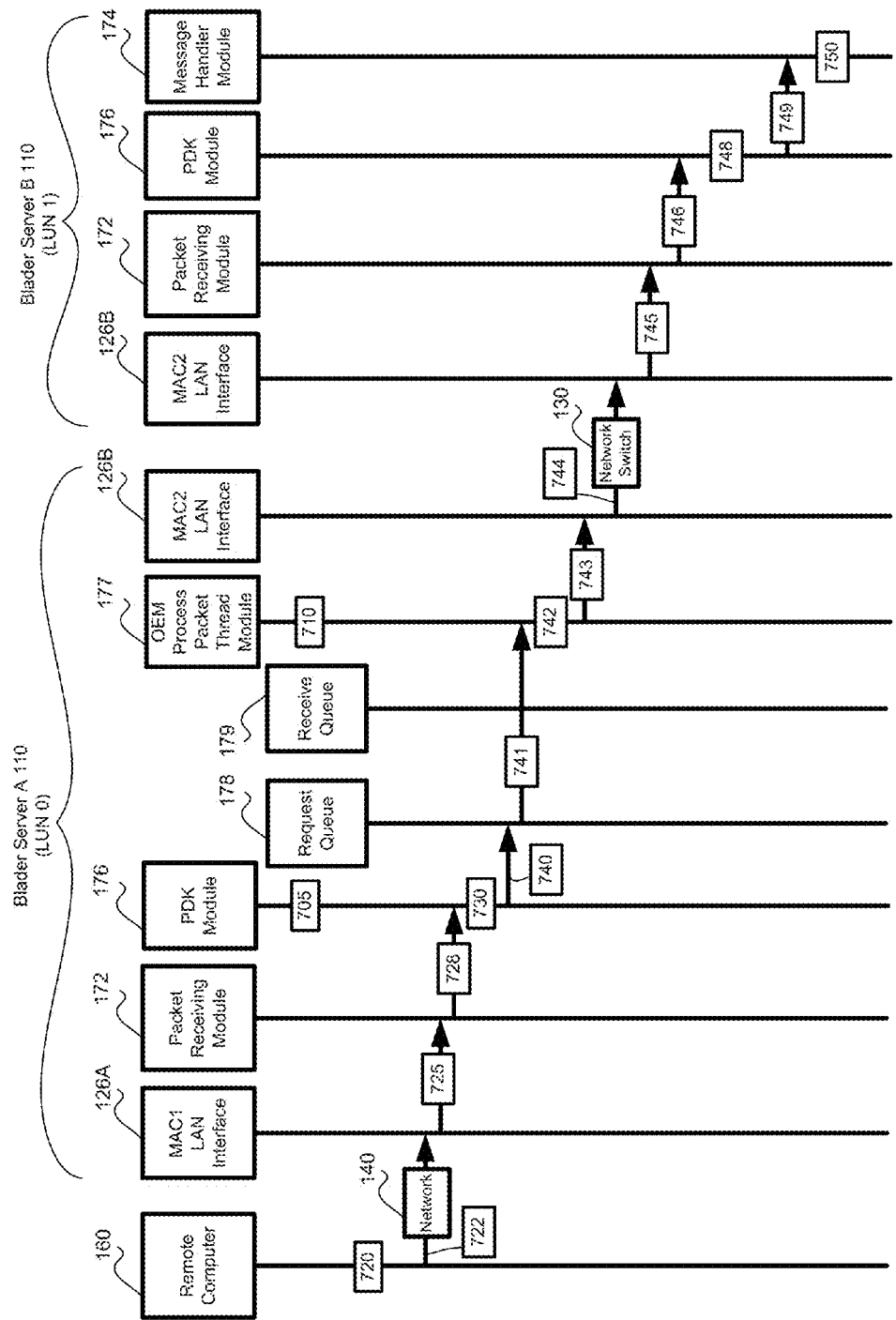
FIGS. 7A and 7B schematically depict the system process for an IPMI message generated by the remote computer to the blade server having the LUN 0 according to certain embodiments of the present disclosure.
Figure 7B:
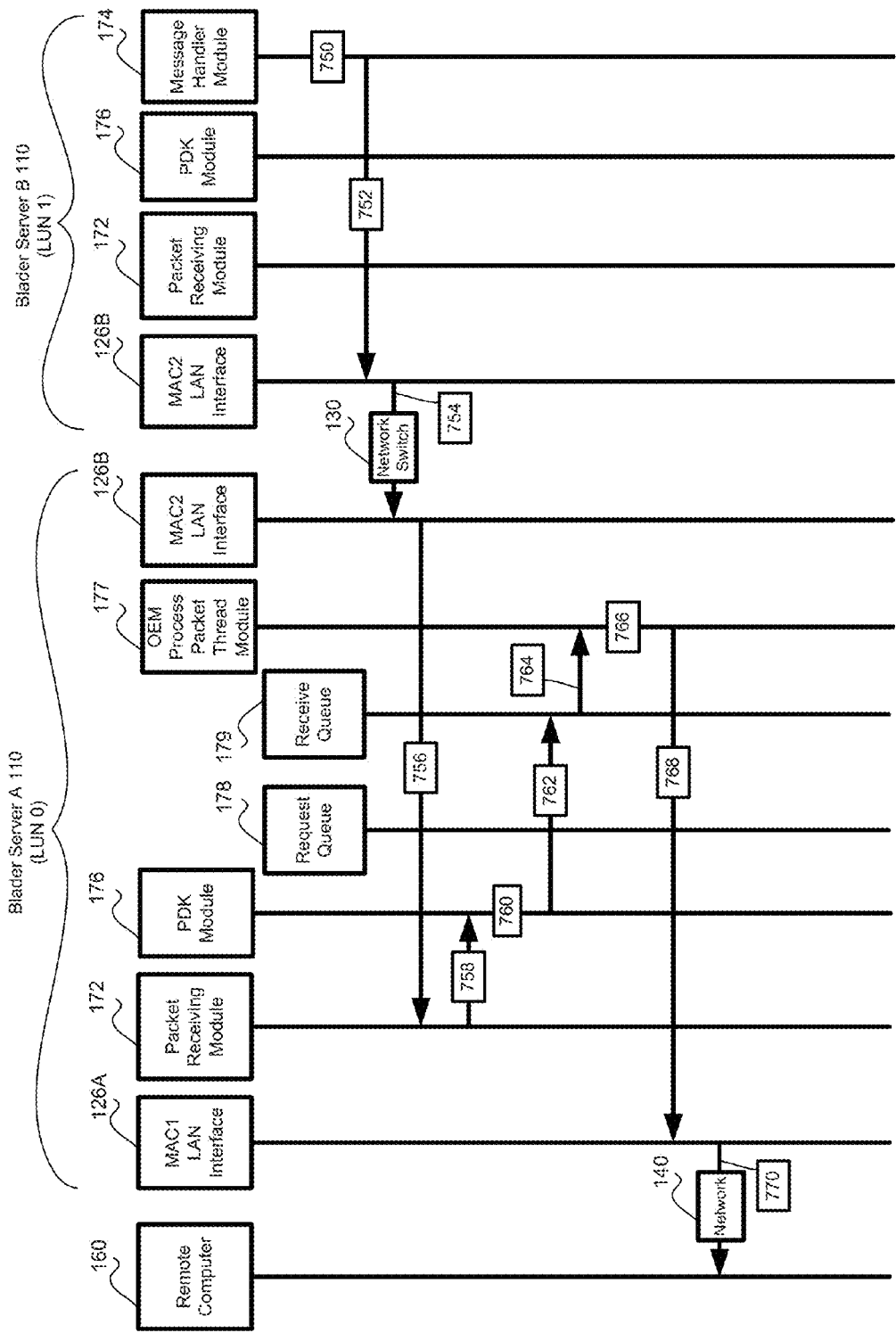

FIGS. 7A and 7B schematically depict the system process for an IPMI message generated by the remote computer to the blade server having the LUN 0 according to certain embodiments of the present disclosure.

Referring to FIG. 7A, at procedure 705, the PDK module 176 generates a request queue 178 and a response queue 179. At procedure 710, the OEM process packet thread module 177 establishes IPMI sessions with the MAC2 LAN interface (UDP port 623) of each of the other available blade servers 110 through the network switch 130, and maintains the session ID in an array, a global table or map based on the LUN of each of the other available blade servers 110 for future communication. It should be appreciated that the operations of the PDK module 176 and the OEM process packet thread module 177 may be independent from each other, and there is no specific sequence as to whether the PDK module 176 generates a request queue 178 and a response queue 179 before or after the OEM process packet thread module 177 establishes IPMI sessions.

At procedure 720, the remote computer 160 generates an IPMI request message packet, where the LUN field of the IPMI request message has the value of 1, identifying that the destination of the IPMI request message is the second blade server B 110. At procedure 722, the remote computer 160 sends the IPMI request message packet to the blade server system 100 via the network 140. Since the first blade server A 110 is the only blade server 110 directly connected to the network 140, the IPMI request message packet is sent to the MAC1 LAN interface 126A of the first blade server A 110.

At the first blade server A 110, at procedure 725, the packet receiving module 172 receives the IPMI request message packet from the MAC1 LAN interface 126A. At procedure 728, the packet receiving module 172 sends the IPMI request message packet to the PDK module 176 for process. At procedure 730, the PDK module 176 parses the header of the IPMI request message packet, and determines that the IPMI request message packet is for the second blade server B 110, since the LUN field of the header includes the value of 1 and the NetFn field of the header indicates the message packet as a request message packet. At procedure 740, the PDK module 176 posts the IPMI request message packet to the request queue 178.

At procedure 741, the OEM process packet thread module 177 receives the IPMI request message packet from the request queue 178. At procedure 742, the OEM process packet thread module 177 processes with the IPMI request message packet, saves a copy of the header of the request message packet, and generates a MAC2 LAN request message packet for the second blade server B 110 with the LUN of 1. Details of the process of the OEM process packet thread module 177 has been described with reference to FIG. 4, and is hereinafter not repeated.

At procedure 743, the OEM process packet thread module 177 sends the MAC2 LAN request message packet to the MAC2 LAN interface 126B. At procedure 744, the MAC2 LAN request message packet is sent to the MAC2 LAN interface 126B of the second blade server B 110 via the network switch 130 (i.e. the internal network of the blade server system 100).

At the second blade server B 110, at procedure 745, the packet receiving module 172 receives the MAC2 LAN request message packet from the MAC2 LAN interface 126B. At procedure 746, the packet receiving module 172 sends the MAC2 LAN request message packet to the PDK module 176 for process. At procedure 748, the PDK module 176 parses the header of the MAC2 LAN request message packet, and determines that the MAC2 LAN request message packet is for the second blade server B 110, since the LUN field of the header includes the value of 1. At procedure 749, the PDK module 176 posts the IPMI request message packet to the message handler module 174. At procedure 750, the message handler module 174 processes with the IPMI request message packet, and generates a corresponding response message packet.

Referring to FIG. 7B, after processing the request message packet, at procedure 752, the message handler module 174 sends the response message packet back to the MAC2 LAN interface 126B where the MAC2 LAN request message packet was received. At procedure 754, the response message packet is sent back to the MAC2 LAN interface 126B of the first blade server A 110 via the network switch 130.

Back to the first blade server A 110, at procedure 756, the packet receiving module 172 receives the response message packet from the MAC2 LAN interface 126B. At procedure 758, the packet receiving module 172 sends the response message packet to the PDK module 176 for process. At procedure 760, the PDK module 176 parses the header of the response message packet, and determines that the message packet is a response message packet from the second blade server B 110, since the LUN field of the header includes the value of 1 and the NetFn field of the header indicates the message packet as a response message packet. At procedure 762, the PDK module 176 posts the response message packet to the response queue 179.

At procedure 764, the OEM process packet thread module 177 receives the response message packet from the response queue 179. At procedure 766, the OEM process packet thread module 177 processes with the response message packet, retrieves the saved header of the request message packet, and refills the saved header to the response message packet. Details of the process of the OEM process packet thread module 177 has been described with reference to FIG. 5, and is hereinafter not repeated.

At procedure 768, the OEM process packet thread module 177 sends the response message packet to the MAC1 LAN interface 126A where the request message packet was received. At procedure 770, the response message packet is sent back to remote computer 160 via the network 140.

It should be appreciated that the blade server system 100 may be connected with a plurality of remote computers 160, and each of the remote computers 160 may generate IPMI request message packets for different blade servers 110 of the blade server system 100. As discussed above, the PDK module 176 of the first blade server A 110 will post each IPMI request message packets to the message handler module 174, the request queue 178 or the response queue 179, such that the PDK module 176 is freed up for processing the next message packet, and will not block the next incoming requests.

As discussed above, the present disclosure utilizes the LUN field of the header of the IPMI message packets to identify the destination of the IPMI message packets. Thus, the only OEM part of the IPMI message packet, which is different from a normal IPMI message packet, is the LUN field. The user or the remote application at the remote computer 160 may modify the LUN field of the IPMI message packet without the need to formulate the Send Message command and encapsulate the IPMI command. This may simplify the IPMI commands needed to obtain a full system view of the chassis 105 of the blade server system 100.

Further, the LUN field, which is a 2-bit field, may identify at most four blade servers 110. Thus, the blade server system 100 may include at most four blade servers 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a network switch; and
at most four service processors (SP's) interconnected with one another via the network switch, wherein each of the at most four SP's is assigned with a logical unit number (LUN) of 0, 1, 2 or 3, and comprises a processor, a non-volatile memory and at least one system interface,
wherein for each SP, the non-volatile memory stores computer executable codes are configured to, when executed at the processor,
receive a message packet from the at least one system interface, wherein the message packet comprises a header identifying the message packet as a request message packet or a response message packet, and wherein the header comprises a LUN field identifying one of the at most four SP's,
identify, based on the header and the LUN field of the message packet, the message packet as a first request message packet having one other of the at most four SP's as a destination of the message packet, an intermediate response message packet from one other of the at most four SP's in response to the first request message packet, or a second request message packet having the SP as the destination of the message packet by:
identifying whether a value of the LUN field of the message packet matches the LUN assigned with the SP,
when the value of the LUN field of the message packet matches the LUN assigned with the SP, determining the message packet as the second request message, and
when the value of the LUN field of the message packet does not match the LUN assigned with the SP, identifying one other of the at most four SP's having the LUN assigned with the value of the LUN field of the message packet as an identified SP, and determining the message packet as the first request message packet or the intermediate response message packet by:
identifying, based on the header of the message packet, the message packet as the request message packet or the response message packet,
when the header of the message packet indicates the message packet as the request message packet, determining the message packet as the first request message packet having the identified SP as the destination, and
when the header of the message packet indicates the message packet as the response message packet, determining the message packet as the intermediate response message packet from the identified SP,
when the message packet is the first request message packet, save a copy of the header of the first request message packet, and send the first request message packet to the destination,
when the message packet is the intermediate response message packet in response to the first request message packet, retrieve the saved copy of the header of the first request message packet, and replace the header of the intermediate response message packet with the saved copy of the header of the first request message packet to generate a final response message packet, and
when the message packet is the second request message packet, process the second request message packet to generate a second response message packet in response to the second request message packet.

2. The system as claimed in claim 1, wherein the at least one system interface comprises a local area network (LAN) interface, a standardized interface under an Intelligent Platform Management Interface (IPMI) standard, or a universal serial bus (USB) interface.

3. The system as claimed in claim 2, wherein the standardized interface comprises a keyboard controller style (KCS) interface, a system management interface chip (SMIC) interface, and a block transfer (BT) interface.

4. The system as claimed in claim 1, wherein each of the at most four SP's is a baseboard management controller (BMC).

5. The system as claimed in claim 1, further comprising at most four blade servers, each corresponding to one of the at most four SP's.

6. The system as claimed in claim 1, wherein the codes comprise:
a packet receiving module configured to receive the message packet from the at least one system interface;

a message handler module configured to, when the message packet is the second request message packet, process the second request message packet to generate the second response message packet in response to the second request message packet; and a platform development kit (PDK) module configured to generate a request queue and a response queue,
identify, based on the header and the LUN field of the message packet, the message packet as the first request message packet, the intermediate response message packet, or the second request message packet,
when the message packet is the first request message packet, send the message packet to the request queue,
when the message packet is the intermediate response message packet, send the message packet to the response queue, and
when the message packet is the second request message packet, send the message packet to the message handler module.

7. The system as claimed in claim 6, wherein for the SP assigned with the LUN of 1, 2 or 3, the PDK module is configured to identify the message packet as the second request message packet.

8. The system as claimed in claim 6, wherein for the SP assigned with the LUN of 0, the codes further comprise:
an original equipment manufacturer (OEM) process packet thread module, configured to
receive the first request message packet from the request queue,
save the copy of the header of the first request message packet,
replace the header of the first request message packet with a LAN header to generate a LAN request message packet, and send the LAN request message packet to the destination,
receive the intermediate response message packet from the response queue, and
retrieve the saved copy of the header of the first request message packet, and replace the header of the intermediate response message packet with the saved copy of the header of the first request message packet to generate the final response message packet.

9. The system as claimed in claim 1, wherein the message packet is an IPMI OEM message packet.

10. The system as claimed in claim 9, wherein the header of the message packet comprises a network function (NetFn) field identifying the message packet as the request message packet or the response message packet.

11. A method of forwarding messages in a blade server system, comprising:
receiving, at a service processor (SP) of the blade server system, a message packet from a system interface of the SP, wherein the blade server system comprises a network switch and at most four SP's interconnected with one another via the network switch, wherein each of the at most four SP's is assigned with a logical unit number (LUN) of 0, 1, 2 or 3, and wherein the message packet comprises a header identifying the message packet as a request message packet or a response message packet, wherein the header comprises a LUN field identifying one of the at most four SP's of the blade server system;
based on the header and the LUN field of the message packet, identifying, at the SP, the message packet as a first request message packet having one other of the at most four SP's as a destination of the message packet, an intermediate response message packet from one other of the at most four SP's in response to the first request message packet, or a second request message packet having the SP as the destination of the message packet by:
identifying whether a value of the LUN field of the message packet matches the LUN assigned to the SP;
when the value of the LUN field of the message packet matches the LUN assigned to the SP, determining the message packet as the second request message, and
when the value of the LUN field of the message packet does not match the LUN assigned to the SP, identifying one other of the at most four SP's having the LUN assigned with the value of the LUN field of the message packet as an identified SP, and determining the message packet as the first request message packet or the intermediate response message packet by:
identifying, based on the header of the message packet, the message packet as the request message packet or the response message packet;
when the header of the message packet indicates the message packet as the request message packet, determining the message packet as the first request message packet having the identified SP as the destination; and
when the header of the message packet indicates the message packet as the response message packet, determining the message packet as the intermediate response message packet from the identified SP;
when the message packet is the first request message packet, saving, at the SP, a copy of the header of the first request message packet, and sending the first request message packet to the destination;
when the message packet is the intermediate response message packet in response to the first request message packet, retrieving, at the SP, the saved copy of the header of the first request message packet, and replacing the header of the intermediate response message packet with the saved copy of the header of the first request message packet to generate a final response message packet; and
when the message packet is the second request message packet, processing, at the SP, the second request message packet to generate a second response message packet in response to the second request message packet.

12. The method as claimed in claim 11, wherein the at least one system interface comprises a local area network (LAN) interface, a standardized interface under an Intelligent Platform Management Interface (IPMI) standard, or a universal serial bus (USB) interface, and wherein the standardized interface comprises a keyboard controller style (KCS) interface, a system management interface chip (SMIC) interface, and a block transfer (BT) interface.

13. The method as claimed in claim 11, wherein each of the at most four SP's is a baseboard management controller (BMC), wherein the blade server system further comprises at most four blade servers, and wherein each of the at most four blade servers corresponds to one of the at most four SP's.

14. The method as claimed in claim 11, further comprising:
generating, at a platform development kit (PDK) module of the SP, a request queue and a response queue, wherein the PDK module is configured to, based on the header and the LUN field of the message packet, identify the message packet as the first request message packet, the intermediate request message packet, or the second request message packet;
when the message packet is the first request message packet, sending, at the PDK module of the SP, the message packet to the request queue, wherein an original equipment manufacturer (OEM) process packet thread module is configured to receive the first request message packet from the request queue, save the copy of the header of the first request message packet, replace the header of the first request message packet with a LAN header to generate a LAN request message packet, and send the LAN request message packet to the destination;

when the message packet is the intermediate response message packet, sending, at the PDK module of the SP, the message packet to the response queue, wherein the OEM process packet thread module is configured to receive the intermediate response message packet from the response queue, retrieve the saved copy of the header of the first request message packet, and replace the header of the intermediate response message packet with the saved copy of the header of the first request message packet to generate the final request message packet; and when the message packet is the second request message packet, sending, at the PDK module of the SP, the message packet to a message handler module of the SP, wherein the message handler module is configured to process the second request message packet to generate the second response message packet in response to the second request message packet.

15. The method as claimed in claim 14, wherein for the SP assigned with the LUN of 1, 2 or 3, the PDK module is configured to identify the message packet as the second request message packet.

16. The method as claimed in claim 11, wherein the message packet is an IPMI OEM message packet.

17. The method as claimed in claim 16, wherein the header of the message packet comprises a network function (NetFn) field identifying the message packet as the request message packet or the response message packet.

18. A non-transitory computer readable medium storing computer executable codes, wherein the codes, when executed at a processor of a service processor (SP) of a blade server system, are configured to receive a message packet from a system interface of the SP, wherein the blade server system comprises a network switch and at most four SP's interconnected with one another via the network switch, wherein each of the at most four SP's is assigned with a logical unit number (LUN) of 0, 1, 2 or 3, and wherein the message packet comprises a header identifying the message packet as a request message packet or a response message packet, wherein the header comprises a LUN field identifying one of the at most four SP's of the blade server system, identify, based on the header and the LUN field of the message packet, the message packet as a first request message packet having one other of the at most four SP's as a destination of the message packet, an intermediate response message packet from one other of the at most four SP's in response to the first request message packet, or a second request message packet having the SP as the destination of the message packet by:

identifying whether a value of the LUN field of the message packet matches the LUN assigned with the SP, when the value of the LUN field of the message packet matches the LUN assigned with the SP, determining the message packet as the second request message, and when the value of the LUN field of the message packet does not match the LUN assigned with the SP, identifying one other of the at most four SP's having the LUN assigned with the value of the LUN field of the message packet as an identified SP, and determining the message packet as the first request message packet or the intermediate response message packet by:

identifying, based on the header of the message packet, the message packet as the request message packet or the response message packet, when the header of the message packet indicates the message packet as the request message packet, determining the message packet as the first request message packet having the identified SP as the destination, and when the header of the message packet indicates the message packet as the response message packet, determining the message packet as the intermediate response message packet from the identified SP, when the message packet is the first request message packet, save a copy of the header of the first request message packet, and send the first request message packet to the destination, when the message packet is the intermediate response message packet in response to the first request message packet, retrieve the saved copy of the header of the first request message packet, and replace the header of the intermediate response message packet with the saved copy of the header of the first request message packet to generate a final response message packet, and when the message packet is the second request message packet, process the second request message packet to generate a second response message packet in response to the second request message packet.

19. The non-transitory computer readable medium as claimed in claim 18, wherein the at least one system interface comprises a local area network (LAN) interface, a standardized interface under an Intelligent Platform Management Interface (IPMI) standard, or a universal serial bus (USB) interface, and wherein the standardized interface comprises a keyboard controller style (KCS) interface, a system management interface chip (SMIC) interface, and a block transfer (BT) interface.

20. The non-transitory computer readable medium as claimed in claim 18, wherein each of the at most four SP's is a baseboard management controller (BMC), wherein the blade server system further comprises at most four blade servers, and wherein each of the at most four blade servers corresponds to one of the at most four SP's.

21. The non-transitory computer readable medium as claimed in claim 18, wherein the codes comprise:

a packet receiving module configured to receive the message packet from the at least one system interface;

a message handler module configured to, when the message packet is the second request message packet, process the second request message packet to generate the second response message packet in response to the second request message packet; and a platform development kit (PDK) module configured to generate the request queue and a response queue, identify, based on the header and the LUN field of the message packet, the message packet as the first request message packet, the intermediate response message packet, or the second request message packet, when the message packet is the first request message packet, send the message packet to the request queue, when the message packet is the intermediate response message packet, send the message packet to the response queue, and when the message packet is the second request message packet, send the message packet to the message handler module.

22. The non-transitory computer readable medium as claimed in claim 21, wherein for the SP assigned with the LUN of 1, 2 or 3, the PDK module is configured to identify the message packet as the second request message packet.

23. The non-transitory computer readable medium as claimed in claim 21, wherein for the SP assigned with the LUN of 0, the codes further comprise:

an original equipment manufacturer (OEM) process packet thread module, configured to receive the first request message packet from the request queue, save the copy of the header of the first request message packet, replace the header of the first request message packet with a LAN header to generate a LAN request message packet, and send the LAN request message packet to the destination, receive the intermediate response message packet from the response queue, and retrieve the saved copy of the header of the first request message packet, and replace the header of the intermediate response message packet with the saved copy of the header of the first request message packet to generate the final request message packet.

24. The non-transitory computer readable medium as claimed in claim 18, wherein the message packet is an IPMI OEM message packet.

25. The non-transitory computer readable medium as claimed in claim 24, wherein the header of the message packet comprises a network function (NetFn) field identifying the message packet as the request message packet or the response message packet.

* * * * *